United States Patent Office 3,597,337
Patented Aug. 3, 1971

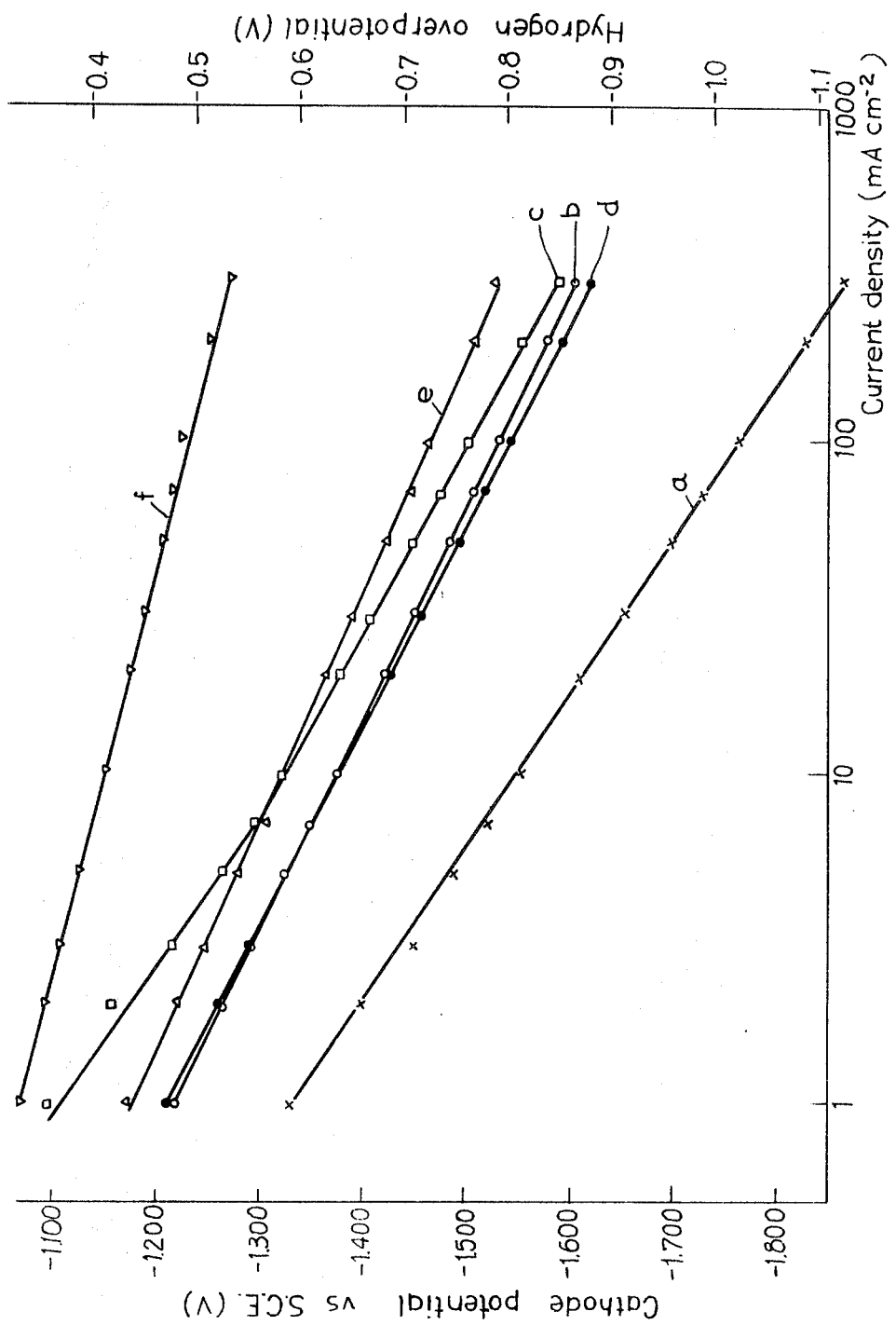

3,597,337
BIPOLAR CELLS FOR THE ELECTROLYTIC PRODUCTION OF HALOGENATES
Milan M. Jaksic, Branislav Nikolich, and Dusan M. Karanovic, Belgrade, Yugoslavia, assignors to Institut Za Hemijska, Tehnoloska i Metalurska Istrazivanja, Belgrade, Yugoslavia
Filed June 12, 1968, Ser. No. 736,503
Claims priority, application Yugoslavia, Dec. 16, 1967, P 2,457/67
Int. Cl. B01k *1/00, 3/06;* C01b *11/26*
U.S. Cl. 204—45      2 Claims

ABSTRACT OF THE DISCLOSURE

To improve bipolar cells for the electrolytic production of halogenates, a metal such as chromium and molybdenum is deposited on the cathode surfaces of the graphite electrodes of the cells whereby there results a reduction in required cell voltage and power consumption.

DRAWING

The sole figure is a chart comparing the operation of different electrodes in bipolar cells.

DETAILED DESCRIPTION

In the design and construction of apparatus with larger capacities for the electrolytic production of chlorates, bipolar cells with graphite electrodes have recently been used.

An object of this invention is to improve the voltage-current characteristics of bipolar cells with graphite electrodes for the electrolytic production of halogenates, and particularly those for the production of chlorates.

The advantages of bipolar constructions as compared to monopolar cells are evident from the following:

(a) The current flow is exclusively direct, with a uniform distribution of its lines normal to the largest surface area of the parallelopiped shaped electrode, which allows the shortest path and the lowest voltage drop through the graphite. The feeding of monopolar cells with anode current is carried out, however, at the smallest cross-sectional area of the graphite plate, which thus defines the total resistance and losses, and the current lines successively branch, when the direction changes, steeply to the two side surfaces of the largest anode section area and lengthwise over the whole electrode, thus making a very lengthy path. In spite of the fact that monopolar cells possess twice the available anode surface area, the current density is limited by the specific resistance and the lowest section area of the graphite plates.

(b) While the electric contact for supplying monopolar cells with current is carried out directly through all the available graphite anodes, the supply of bipolar cells is carried out only through the first and the last plate. Thus the overall voltage drop of metal conductors and their contact with graphite for bipolar cells is reduced to an insignificant value. At the same time it represents a significant reduction in investment costs as a consequence of the reduced quantity of copper required per installed capacity.

(c) Graphite plates of bipolar cells are exposed with all their surface area to the electrochemical process, while that part of the monopolar cells anodes which is above the electrolyte remains ineffective, which results in higher graphite consumption per unit product.

(d) Bipolar cells allow minimal distances between the electrodes, which represents a further reduction in voltage on one hand and, on the other, a corresponding reduction of the volume of the electrolyte. Bipolar cells thus allow a forced electrolyte flow, significant for removing the produced amount of chlorine and maintaining its concentration inside the cells, for a given current density, in the interval of permissible values. It is known that current losses are directly proportional to the hypochlorite ion concentration. Therefore, by working in this manner it is possible to achieve better current efficiency and thus better power efficiency.

(e) Due to the forced flow of the electrolyte with sufficient conversion of available chlorine to chlorate in a space outside the cell, proportional to the maintenance of minimal amounts of hypochlorite in bipolar cells, the graphite consumption per unit product is reduced.

(f) When constructing bipolar cells it is possible to adjust the distance between the electrodes to be proportional to the consumption of graphite on the anode side, which would enable operation at a fixed voltage power consumption.

(g) Owing to the forced flow of the electrolyte, a shorter period of keeping the gas and a low gas content in the electrolyte are possible and, consequently, better conductivity of the electrolyte and thus a lower cell voltage. In addition, the adsorbed gas bubbles reduce the electrode surface area thus leading to further polarization, that the forced circulation of the electrolyte constitutes an additional depolarization and cell voltage reduction factor.

(h) Bipolar cells are relatively simpler and cheaper to construct.

The disadvantages of bipolar cells include the considerably worse cathode polarization characteristics of graphite compared to those of the metal, such as steel and 18 Cr–8 Ni-stainless steel, used for making cathodes in monopolar cells for the electrolytic production of halogenates.

New methods have been described for depolarization for hydrogen cathode evolution in decomposers of mercury cells by metallizing graphite by suitable electrodeposition on it of molybdenum and cobalt.

It has been shown that by using a cathode of chromium or chromium plated stainless steels in chlorate cells, cathode reduction of hypochlorite ion can be efficiently suppressed even without adding bichromate.

Cathode polarization curves for hydrogen evolution on chromium are considerably shifted to higher positive potential values as compared to graphite, and particularly as compared to impregnated hydrophobized graphite, for identical electrolytic media, regardles of whether they contained chromate ions.

An object of this invention is to improve cathode polarization characteristics, and to reduce voltages in bipolar cells for the electrolytic production of chlorates and other halogenates, by suitable metallizing of the cathode side of graphite plates, particularly with molybdenum, chromium or some other suitable metal.

One obtains the most important depolarization effects by impregnation of the graphite plates with a saturated solution of molybdate or by the addition of molybdate in brine during the electrolytic process. In either case the molybdate is cathodically reduced on the cathode sides of the electrodes to a highly catalytic, active form, which effectively depolarizes the cathode potential of the electrodes and cell voltage. This depolarization method is considered as the most important among other possible methods for improvements in cathodic polarization characteristics by metallizing the graphite surfaces.

It is well known that oxide coatings on chromium surfaces represent a semipermeable membrane which allows unhindered hydrogen cathode evolution, but efficiently suppresses cathode reduction of the hypochlorite ions. Therefore, chromium was selected as one of the electrocatalytic coatings in the further development of metallized graphite cathodes for the depolarized hydrogen evolution.

It has been shown that metal deposits in minimal amounts basically change polarization characteristics for hydrogen cathode evolution on graphite. Thereby the electrode exhibits cathode properties of the deposited metal which, by suitable development of the surface, could be shifted to even more positive values of the potential for given current densities, calculated on the apparent geometrical surface area of the graphite basis.

Chromium coating of graphite could, for example, be obtained with very good adhesion properties and for a sufficiently developed dull surface, from tetrachromate baths: chromic anhydride $(Cr_2O_3)$—300 g.p.l., NaOH—56–60 g.p.l., $H_2SO_4$—0.6–0.75 g.p.l., ethanol (96%) 1 ml.p.l., temperature 16–22° C., current density 150 amp. dm.$^{-2}$, while the insoluble alloy Pb 90-Sb 10 is used as anode.

Depolarization effect and polarization characteristics of different cathode materials for the electrolytic production of chlorates are shown in FIG. 1, where Tafel line (a) represents polarization characteristics of graphite (SIGRI Elektrographit, Meitingen, Deutscheland, type EKS), (b) the same characteristics of graphite with a 60 micron chromium coating according to the above given method, (c) the corresponding characteristics for steel, (d) the same characteristics for Cr 18-Ni 8 stainless steel, (e) polarization characteristics for graphite impregnated with a saturated $Na_2MoO_4$ solution and with 1 g.p.l. of molybdate present in the solution investigated, and, finally (f) polarization characteristics of graphite with a coating of cobalt, deposited from chloride solutions. In all the cases investigated, the electrolyte was 300 g.p.l. NaCl, 4–5 g.p.l. $Na_2CR_2O_7$, pH 8.0, in the presence of available chlorine.

It can be noted that the depolarization of hydrogen cathode evolution is achieved with minimal additions of molybdate, particularly in the region of higher current densities, corresponding to those for cathodes of metal itself or are even more positive.

The required thickness and durability of the chromium deposit depend on the conditions and working regime in the production of chlorates, as well as of the thickness and durability of graphite. In any case, after a given graphite charge is used up, the remaining chromium coating could be recovered by dissolution and redeposited on new graphite electrodes.

What is claimed is:

1. A method of improving bipolar cells used for the electrolytic production of halogenates, said cells including graphite electrodes having cathode surfaces, said method comprising depolarizing cathodic hydrogen evolution by depositing molybdenum on the cathode surfaces of the electrodes, whereby there results an overall reduction of cell voltage and power consumption required for said production.

2. A method as claimed in claim 1, wherein the graphite is impregnated with molybdate solution.

References Cited

UNITED STATES PATENTS

| | | | |
|---|---|---|---|
| 1,917,188 | 7/1933 | Eaton | 204—51 |
| 2,177,392 | 10/1939 | Mardick | 204—51 |
| 2,547,120 | 4/1951 | Herwig | 204—51 |
| 3,291,714 | 12/1966 | Hall et al. | 204—268X |
| 3,412,000 | 11/1968 | Bedi | 204—51X |
| 3,441,495 | 4/1969 | Colman | 204—268 |
| 2,499,807 | 3/1950 | Yntema | 204—45X |
| 2,943,029 | 6/1960 | Wernlund | 204—45X |
| 3,196,050 | 7/1965 | Thompson | 204—294X |
| 3,451,914 | 6/1969 | Colman | 204—290X |

FREDERICK C. EDMUNDSON, Primary Examiner

U.S. Cl. X.R.

204—95, 268, 290, 294